No. 777,314. PATENTED DEC. 13, 1904.
W. STRUCK.
FASTENING FOR MASSIVE TIRES.
APPLICATION FILED JUNE 8, 1904.
NO MODEL.

Witnesses:

Inventor:
Wilhelm Struck.
By Knight Bros
attys.

No. 777,314. Patented December 13, 1904.

UNITED STATES PATENT OFFICE.

WILHELM STRUCK, OF FRIEDENAU, NEAR BERLIN, GERMANY, ASSIGNOR TO B. POLACK, A FIRM OF WALLERSHAUSEN, THÜRINGEN, GERMANY.

FASTENING FOR MASSIVE TIRES.

SPECIFICATION forming part of Letters Patent No. 777,314, dated December 13, 1904.

Application filed June 8, 1904. Serial No. 211,643. (No model.)

*To all whom it may concern:*

Be it known that I, WILHELM STRUCK, a citizen of the free town of Hamburg, and a resident of 12 Illstrasse, Friedenau, near Berlin, Germany, have invented certain new and useful Improvements in the Fastening of Massive Tires, of which the following is a specification.

The method of fixing rubber tires to the wheels of vehicles by means of removable lateral rings provided with radial projections by means of which they enter slots in the felly or rim is known, and it is also not novel to provide a solid rubber tire with an inner metal core or layer for limiting its expansion.

The present invention refers to improvements relating to solid rubber tires; and it consists in making the metal core or layer to project from the tire and providing it with a head or the like, so that when mounting the tire on the felly all the force can be directly exerted on said core or layer.

Figure 1:
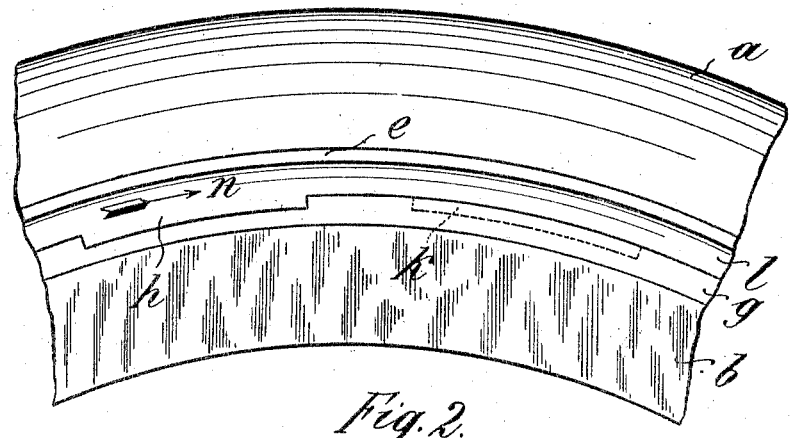
Figure 2:
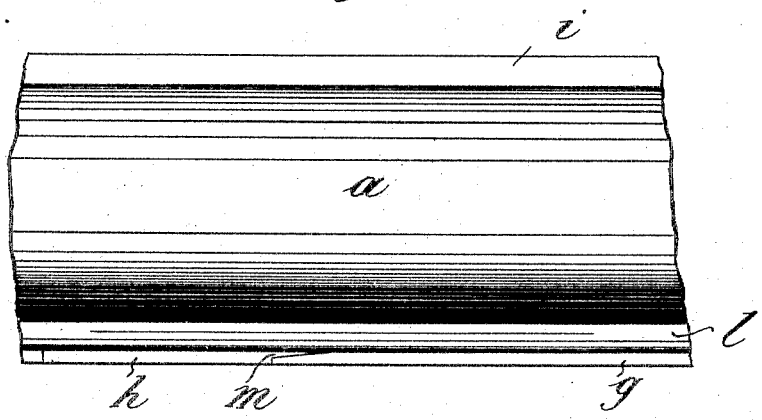
Figure 3:
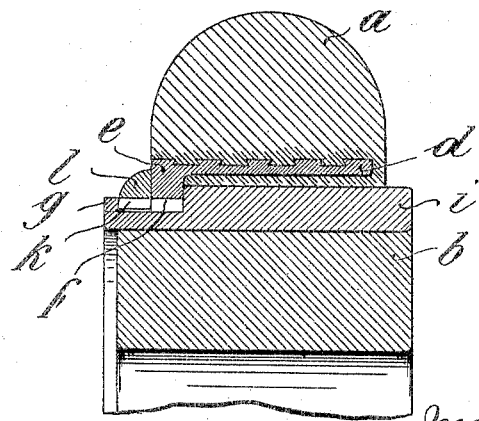

In the annexed drawings part of a tire of this kind is shown in Figures 1 and 2 in side view and plan, respectively, and in Fig. 3 in cross-section.

$a$ is the rubber tire, $d$ the metal core or layer, and $e$ is the head of said core projecting from the tire. $i$ is the metal felly or rim, and $b$ is the wooden felly, of the wheel when the latter is required.

As shown in Fig. 2, the edge $g$ of rim $i$ can be either cut away in wedge form, as at $m$, or projections $k$ on the fixing-ring $l$ can be formed as wedges.

The metal rim $i$ is provided with an annular groove $f$ for reception of the head $e$ and the fixing-ring $l$. The edge $g$ of the rim $i$ projects above said groove $f$ only so far that the head $e$ of the metal core lying against the rim may pass over said edge $g$. This edge is also provided with recesses $h$ and the ring $l$ with inwardly-directed projections $k$, (shown in Fig. 1 in dotted lines,) said projections being of the same or slightly less length than the recess $h$, so that the ring $l$ is connected bayonet fashion to the rim.

When the projections $k$ of the ring $l$ are passed through the recesses $h$ in the annular groove $f$ of the rim and the ring is then turned, for instance, in the direction indicated by the arrow $n$, Fig. 1, it bears against the head $e$ and presses the tire into the rim $i$, the wedge-like reduction of the edge $g$ or of the projections $k$ facilitating the introduction of the ring $l$ and effecting a strong pressure of the tire on the rim.

It is preferable that the rubber be harder adjacent the metal core or layer $d$ than at the other parts.

Owing to the above arrangement, the tire and rim need only correspond as regards diameters, no restrictions as to width being necessary.

What I claim as my invention, and desire to secure by United States Letters Patent, is—

The combination, in a fastening for massive tires on wheel-fellies, with a metal mounting $d$ in the massive tire $a$ of a projection $e$ on one of its sides, said projection fitting in a groove formed by the felly $i$ and the felly-ring $l$, substantially as and for the purpose set forth.

The foregoing specification signed at Berlin, Germany, this 12th day of December, 1903.

WILHELM STRUCK.

In presence of—
   HENRY HASPER,
   WOLDEMAR HAUPT.